United States Patent Office 3,472,636
Patented Oct. 14, 1969

3,472,636
HYDRAZINIUM SALTS OF TETRADECA-HYDROUNDECABORATES
Walter H. Knoth, Jr., Mendenhall, Pa., assignor to E. I. du Pont de Nemours and Company, Wilmington, Del., a corporation of Delaware
No Drawing. Filed May 7, 1962, Ser. No. 193,654
Int. Cl. C01b 21/16
U.S. Cl. 23—358      6 Claims

ABSTRACT OF THE DISCLOSURE

Hydrazinium salts of the type $RR'NNH_3B_{11}H_{14}$ wherein R and R' are groups selected from the class consisting of hydrogen and lower alkyl are disclosed; these salts are prepared by reacting a hydrazine of the formula $$RR'NNH_2$$

with a compound of the formula $R_3{}^2NHB_{11}H_{14}$ at a temperature of from 0° C. to 100° C. and recovering $$RR'NNH_3B_{11}H_{14}$$

product, which finds use in propellant fuels.

---

This invention relates to compositions containing boron and nitrogen. More particularly, it relates to compositions containing hydrazines and selected boron compounds and their preparation.

Compositions containing hydrazine and low molecular weight boron compounds are useful as liquid monopropellants for rocket propulsion motors. However, the compositions now available are deficient in one or more characteristics and they do not perform as well as desired. A need exists, for example, for compositions which combine superior stability during handling and storage with the property of releasing large quantities of energy at controllable rates.

It is an object of the present invention to provide boron-containing compositions which have excellent stability, particularly against premature thermal and oxidative decomposition. It is another object to provide boron-containing compositions which are useful as monopropellant fuels. Other objects will appear hereinafter.

These and other objects of the present invention are obtained by providing compositions of hydrazinium tetradecahydroundecaborates and their fluid mixtures with hydrazines.

The compositions of this invention are defined further as hydrazinium salts of the formula $RR'NNH_3B_{11}H_{14}$ and solutions which consist principally of these salts and a hydrazine of the formula $RR'NNH_2$, where R and R' in both formulas represent hydrogen or lower alkyl groups, e.g., methyl, ethyl, propyl, butyl, and the like.

The compositions which form an especially preferred group, for reasons of cost and availability of components, are (1) $NH_2NH_3B_{11}H_{14}$ and (2) solutions which consist principally of $NH_2NH_3B_{11}H_{14}$ and $NH_2NH_2$ in which the hydrazinium salt forms up to 50% by weight of the solution and is generally present in not less than 5% by weight.

The hydrazinium salts of the present invention are solid products which are easily prepared. They are obtained most conveniently as white crystalline solids which contain up to about 4 moles of the hydrazine as solvent of crystallization. The salts can be obtained free of hydrazine of crystallization by long heating under reduced pressure (0.1 mm. or less of Hg). The hydrazine solvated salts are included within the scope of the compounds of the invention, especially salts of the formula $$NH_2NH_3B_{11}H_{14} \cdot xNH_2NH_2$$

where x is a cardinal number of up to 4.

The stability of the salts of the invention is in sharp contrast to the stability of hydrazinium salts of lower borohydrates. For example, hydrazinium tetrahydroborate ($NH_2NH_3BH_4$) is too unstable to be isolated as a pure compound and it exists only in solution. The salts of the present invention can, as stated above, be isolated and they are stable for prolonged periods in storage. Further, the present hydrazinium salts ($RR'NNH_3B_{11}H_{14}$) resist degradation on heating. They can, for example, be heated to 100° C. or higher without decomposition. The stability of the hydrazinium salts, which is unexpected, is a valuable and useful characteristic.

The hydrazinium salts of the formula $RR'NNH_3B_{11}H_{14}$ are soluble in water and also in polar organic solvents, e.g., dimethylformamide, acetonitrile, and the like. The hydrazinium salts are readily soluble in hydrazines of the formula $RR'NNH_2$, as defined earlier. These solutions are useful as monopropellant rocket fuels and the solutions form a part of this invention.

The solutions, referred to above, contain as essential and characterizing components, a hydrazine of the formula $RR'NNH_2$ and a hydrazinium salt of the formula $RR'NNH_3B_{11}H_{14}$. Jointly, these two components constitute the principal portion of the compositions, i.e., at least 80% by weight of the total composition. Minor amounts of other components can be present, in particular, components which function as freezing-point depressants, e.g., water, hydrogen sulfide, hydrogen cyanide, and the like. However, these components, present in minor quantities, do not constitute the novel and characterizing feature of the fluid compositions or solutions.

The fluid compositions are clear solutions which are liquids at normal atmospheric temperatures. They are stable when heated in air for prolonged periods, e.g., the solutions can be heated at 95–100° C. for several hours (two or more hours) in containers exposed to the air with no evidence of decomposition. The solutions can be stored without degradation in conventional containers customarily used for hydrazines.

Solutions which contain about 35% or more by weight of the hydrazine salt in substantially pure hydrazine may form deposits when cooled to temperatures below atmospheric but these deposits may be redissolved by adding small quantities of water or other solvents, or by heating the solution.

The solutions described above, and the hydrazinium salts as well, are compositions which have a high boron content and, therefore, a high boron-nitrogen ratio. To illustrate, a solution of about 25% by weight of $$NH_2NH_3B_{11}H_{14}$$

in hydrazine contains 17–18% boron. In contrast, a solution of about 25% by weight of a hydrazinium salt of a lower hydroborate, e.g., $NH_2NH_3BH_4$, contains only about 6% by weight of boron. A further advantage of the compositions of the invention lies in the high rate of combustion of hydrazinium salts of tetradecahydroundecaborates. The property permits the release of large quantities of energy under readily controlled conditions. Preferred compositions, which, as stated earlier, are derived from $NH_2NH_2$, have the added advantage of being free of carbon and their value as a high energy fuel is, therefore, enhanced.

The following examples illustrate the hydrazinium salts which are within the scope of the invention:

$NH_2NH_3B_{11}H_{14}$, $CH_3NHNH_3B_{11}H_{14}$
$(CH_3)_2NNH_3B_{11}H_{14}$, $C_2H_5NHNH_3B_{11}H_{14}$
$(C_2H_5)_2NNH_3B_{11}H_{14}$, $(C_3H_7)_2NNH_3B_{11}H_{14}$
and
$(C_4H_9)_2NNH_3B_{11}H_{14}$ Compositions which illustrate the solutions within the scope of the invention are given in the following examples in which quantities are expressed as percent by weight of the total solution:

5% $NH_2NH_3B_{11}H_{14}$-95% $NH_2NH_2$
10% $NH_2NH_3B_{11}H_{14}$-90% $NH_2NH_2$
25% $NH_2NH_3B_{11}H_{14}$-75% $NH_2NH_2$,
12% $(CH_3)_2NNH_3B_{11}H_{14}$-88% $(CH_3)_2NNH_2$
20% $(CH_3)_2NNH_3B_{11}H_{14}$-80% $NH_2NH_2$
15% $C_2H_5NHNH_3B_{11}H_{14}$-85% $C_2H_5NHNH_2$
50% $NH_2NH_3B_{11}H_{14}$-50% $NH_2NH_2$
30% $NH_2NH_3B_{11}H_{14}$-65% $NH_2NH_2$-5% $H_2O$
25% $NH_2NH_3B_{11}H_{14}$-65% $NH_2NH_2$-10% $H_2O$
20% $NH_2NH_3B_{11}H_{14}$-75% $NH_2NH_2$-5% HCN
15% $NH_2NH_3B_{11}H_{14}$-70% $NH_2NH_2$-15% HCN and the like.

The compositions of the invention, both salts and solutions of the salts, are prepared simply and directly by mixing an ammonium salt of the formula $R_3^2NHB_{11}H_{14}$, where $R^2$ is hydrogen or lower alkyl, with a hydrazine of the formula $RR'NNH_2$, where R and R' are, as defined earlier, hydrogen or lower alkyl groups, for a period of time sufficient to expel the nitrogen base, $R_3^2N$, from which the ammonium radical ($R_3^2NH^+$) is derived. Thus, $NH_4B_{11}H_{14}$ and $NH_2NH_2$ can be mixed for a period of time sufficient to expel $NH_3$; $(CH_3)_3NHB_{11}H_{14}$ and $(CH_3)_2NNH_2$ can be mixed for a period sufficient to expel $(CH_3)_3N$, and $C_2H_5NH_3B_{11}H_{14}$ can be mixed with $NH_2NH_2$ until $C_2H_5NH_2$ is expelled. These examples illustrate the simplicity and ease of operation of the process. Other ammonium salts of the $B_{11}H_{14}^{-1}$ anion derived from low-boiling nitrogen bases can be employed, e.g., $B_{11}H_{14}^{-1}$ salts from $C_3H_7NH_2$, $(C_3H_7)_2NH$, $$(\text{iso}=C_3H_7)_2NH$$

and $$C_4H_9NH_2$$

can be employed with hydrazines of the general formula $RR'NNH_2$, where R and R' have the meanings given previously.

In the operation of the process to prepare solutions, the components are usually employed in the quantities necessary to obtain a solution having the desired concentration of hydrazinium salts. These quantities are readily calculated by well known chemical methods and they are based on the fact that one mole of $R_3^2N$ is displaced by one mole of hydrazine to form the hydrazinium salt. Preferably, therefore, the ratio of reactants employed in the process, expressed as moles $RR'NNH_2$/moles $R_3^2NHB_{11}H_{14}$, is at least one and it may be considerably higher.

The reaction usually proceeds rapidly at prevailing atmospheric temperature, e.g., 20–25° C. The rate of reaction can be increased, if desired, by heating the mixture, e.g., up to about 100° C., but heating is not essential for operability. The time for the process is not critical and it will be determined to some extent by the manner of operation. Thus, the process can be operated continuously by passing a slurry in thin layers over surfaces to permit rapid release of the volatile amine or the components can be mixed in a large batch. In a continuous process the reaction is complete within a short time, e.g., a few seconds. In a batch process, a longer time is required, e.g., 15 minutes or more, to complete the reaction.

The hydrazinium salts can be obtained as crystalline solids by removal of excess hydrazine, e.g., by evaporation at atmospheric pressure or pressures less than atmospheric. The salts are reasonably pure as obtained directly in the process but they can, if desired, be purified further by recrystallization from a polar solvent, e.g., water. Measured amounts of the hydrazinium salts and a hydrazine can be mixed to obtain solutions whose composition is accurately controlled. This method forms an optional procedure for preparing the fluid compositions of the invention.

Hydrazines which are employed as one reactant in the process are well known compounds. Operable hydrazines include $NH_2NH_2$, $CH_3NHNH_2$, $C_2H_5NHNH_2$, $(CH_3)_2NNH_2$
$(C_2H_5)_2NNH_2$, $C_4H_9NHNH_2$ and the like. The hydrazines need not be anhydrous and usually they can be employed as purchased in 90% or higher purity. The hydrazine employed to prepare the salt is not necessarily the same hydrazine employed in preparing solutions. To illustrate, $(CH_3)_2NNH_3B_{11}H_{14}$ can be dissolved in $NH_2NH_2$ to obtain a composition of the invention.

The ammonium salts, $R_3^2NHB_{11}H_{14}$, employed as a second reactant in the process, are not generally available products. The products are obtained by reacting decaborane ($B_{10}H_{14}$) with an alkali metal or alkaline earth metal tetrahydroborate (e.g., $NaBH_4$) in an ether and isolating from the reaction mixture a salt of the formula $M(B_{11}H_{14})_n$, where M is an alkali or alkaline earth metal, preferably Na or K, and $n$ is the numerical value for the valence of M, i.e., $n$ is 1 or 2. The ammonium salts, $R_3^2NHB_{11}H_{14}$, are obtained by reacting an aqueous solution of the salt $M(B_{11}H_{14})_n$ with a salt of a nitrogen base of the formula $R_3N$, e.g., $NH_4Cl$, $(CH_3)_3NHCl$, and the like. The ammonium or substituted ammonium salts usually precipitate during the operation and can be separated by conventional methods. The preparation of a representative reactant of the formula $R_3^2NHB_{11}H_{14}$ is described in Example A.

The compositions of the invention and their preparation are illustrated further in the examples which follow.

EXAMPLE A (A) A 500 ml. 3-necked glass vessel is fitted with a dropping funnel, a stirrer and a condenser placed so that condensed vapors are returned to the flask. The flask is charged with 0.95 g. of $NaBH_4$ (0.25 mole) and flushed with nitrogen. An atmosphere of nitrogen is maintained in the flask throughout the process. Dry dioxane (100 ml.) is introduced into the flask. The mixture is stirred and a solution of 3.80 g. of $B_{10}H_{14}$ (0.035 mole) in 100 ml. of dry dioxane is added dropwise to the reaction mixture. A yellow solid forms and this is accompanied by the evolution of hydrogen. The flask is heated to the boiling point of the dioxane (100° C.) and the reaction mixture is refluxed for a total of 16 hours at the end of which time evolution of hydrogen has completely stopped. The reaction mixture is cooled and filtered in a stream of nitrogen. The yellow solid which precipitates is separated and vacuum-dried at 40° C. under ca. 1 mm. of mercury pressure. There is obtained 7.36 g. of $NaB_{11}H_{14} \cdot 2.5C_4H_8O_2$, a compound which can be termed sodium tetradecahydroundecaborate(1−) having 2.5 molecules of dioxanate of crystallization.

*Analysis.* — Calc'd for $NaB_{11}H_{14} \cdot 2.5C_4H_8O_2$: Na, 6.11%; B, 31.62%; C, 31.91%; H, 9.11%. Found: Na, 6.6%; B, 31.06%; C, 31.36%; H, 9.10%.

(B) A solution is prepared consisting of 100 ml. of water and 40 g. of $NaB_{11}H_{14} \cdot 2.5C_4H_8O_2$, obtained by the process described in part A. A second solution is prepared consisting of 25 ml. of water and 10 g. of $(CH_3)_3NHCl$. The two solutions are mixed in a glass reaction vessel and stirred for a short time. The yellow precipitate which forms is separated, dried 3 hours in air and then dried overnight under low pressure. The product, which is $(CH_3)_3NHB_{11}H_{14}$, is obtained in 70–73% yield. It is employed as a reactant to prepare the compositions of the invention.

Other ammonium and substituted ammonium salts of the $B_{11}H_{14}^{-1}$ anion can be prepared by the procedure described in Example A by employing the appropriate ammonium or substituted ammonium halide in part B. Thus, $NH_4Cl$ yields $NH_4B_{11}H_{14}$, $(C_2H_5)_3NHCl$ yields $$(C_2H_5)_3NHB_{11}H_{14}$$

$(C_4H_9)_2NH_2Cl$ yields $(C_4H_9)_2NH_2B_{11}H_{14}$, and the like. These salts of the formula $R_3^2NHB_{11}H_{14}$ can be used to prepare the compositions of the invention.

EXAMPLE I

A mixture is prepared consisting of 0.64 part of $(CH_3)_3NHB_{11}H_{14}$ and 1 part of hydrazine (95%+purity). The mixture is stirred and trimethylamine is liberated. A clear solution of $NH_2NH_3B_{11}H_{14}$ in hydrazine is formed which contains about 37% by weight of the hydrazinium salt. The solution is heated for 2 hours at steam bath temperatures (95–100° C.) in air without evidence of decomposition. The solution is warmed under reduced pressure to remove the hydrazine. A white solid remains which is hydrazinium tetradecahydroundecaborate(1⁻) containing hydrazine as solvent of crystallization. The compound is purified by crystallization from water to obtain the hydrazinium salt having about 4 molecules of hydrazine of crystallization.

*Analysis.*—Calc'd for $NH_2NH_3B_{11}H_{14} \cdot 4NH_2NH_2$: B, 40.5%. Found: B, 38.0%.

EXAMPLE II (A) A mixture of $(CH_3)_3NHB_{11}H_{14}$ and hydrazine hydrate is warmed and a clear solution of $NH_2NH_3B_{11}H_{14}$ in hydrazine is obtained. The solution is warmed under reduced pressure to remove the hydrazine and leave $NH_2NH_3B_{11}H_{14}$ as a white crystalline residue.

(B) A mixture of $(C_2H_5)_3NHB_{11}H_{14}$ and hydrazine is warmed and a clear solution of $NH_2NH_3B_{11}H_{14}$ in hydrazine is obtained. The solution is heated to 80° C. and it shows no signs of degradation or decomposition.

Hydrazinium salts substantially free of hydrazine of crystallization can be obtained by maintaining the salt at very low pressure with mild heating for a time sufficient to remove the hydrazine. It is not necessary, however, to remove the hydrazine of crystallization to prepare the compositions of the invention.

The hydrazinium salt of Examples I and II, with or without hydrazine of crystallization, can be dissolved in a hydrazine of the formula $RR'NNH_2$ to obtain solutions of desired composition, e.g., 5% $NH_2NH_3B_{11}H_{14}$-95% $NH_2NH_2$, 10% $NH_2NH_3B_{11}H_{14}$-90% $NH_2NH_2$, 30% $NH_2NH_3B_{11}H_{14}$-70% $NH_2NH_2$, and 50% $NH_2NH_3B_{11}H_{14}$-50% $NH_2NH_2$. Thus, solutions containing up to 50% by weight of $NH_2NH_3B_{11}H_{14}$ in $NH_2NH_2$, $(CH_3)_2NNH_2$, $(C_2H_5)_2NNH_2$, and the like can be obtained.

The process of Examples I and II is generic for the preparation of hydrazinium salts of the formula $RR'NNH_3B_{11}H_{14}$ and solutions of these salts in a hydrazine of the formula $RR'NNH_2$, where R and R' represent, as stated earlier, hydrogen or lower alkyl groups. Thus, $(CH_3)_3NHB_{11}H_{14}$ and $(CH_3)_2NNH_2$ can be reacted as described in Example I to prepare a solution of $(CH_3)_2NNH_3B_{11}H_{14}$ in $(CH_3)_2NNH_2$. The hydrazine can be evaporated to leave the free salt which can be dissolved in the desired quantity in $NH_2NH_2$ to obtain solutions of $(CH_3)_2NNH_3B_{11}H_{14}$ in $NH_2NH_2$ containing, e.g., 5–50% by weight of the salt. In a similar manner, $$(C_2H_5)_2NNH_3B_{11}H_{14}$$

can be prepared from $(C_2H_5)_2NNH_2$ and $$(C_2H_5)_3NHB_{11}H_{14}$$

to obtain solutions of the salt in the N,N-substituted hydrazine, or, as described, in $NH_2NH_2$.

The compositions of the invention are useful as propellants in liquid rocket propulsion motors. The solutions of hydrazinium salts are useful as monopropellants or they can be used in conjunction with minor quantities of oxidizing agents, e.g., nitrogen tetroxide, fluorine oxide, and the like, to provide fuels with high specific impulses and high heats of combustion.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A hydrazinium tetradecahydroundecaborate of the formula $RR'NNH_3B_{11}H_{14}$ wherein R and R' are groups selected from the class consisting of hydrogen and lower alkyl.

2. A hydrazinium tetradecahydroundecaborate of the formula $NH_2NH_3B_{11}H_{14}$.

3. A hydrazinium tetradecahydroundecaborate of the formula $RR'NNH_3B_{11}H_{14} \cdot xRR'NNH_2$ wherein R and R' are groups selected from the class consisting of hydrogen and lower alkyl, and $x$ is a cardinal number of from 0 through 4.

4. A process for preparing compounds of the formula $RR'NNH_3B_{11}H_{14}$ wherein R and R' are groups selected from the class consisting of hydrogen and lower alkyl which comprises reacting a hydrazine of the formula $RR'NNH_2$ wherein R and R' are defined as above, with a compound of the formula $R_3^2NHB_{11}H_{14}$ wherein $R^2$ is a group selected from the class consisting of hydrogen and lower alkyl, at a temperature of from 0° to 100° C., and isolating the resulting $RR'NNH_3B_{11}H_{14}$.

5. Process of claim 4 wherein the temperature is of from 20° C. to 25° C.

6. A process for preparing a fluid composition of a hydrazine of the formula $RR'NNH_2$ wherein R and R' are groups selected from the class consisting of hydrogen and lower alkyl and a hydrazinium tetradecahydroundecaborate of the formula $RR'NNH_3B_{11}H_{14}$ wherein R and R' are defined as above, which comprises reacting an excess of said hydrazine with a compound of the formula $R_3^2NHB_{11}H_{14}$ wherein $R^2$ is a group selected from the class consisting of hydrogen and lower alkyl, at a temperature of from 0° to 100° C. until $R_3^2N$ is completely expelled.

References Cited

UNITED STATES PATENTS 3,148,938  9/1964  Knoth _____ 23—358
3,328,134  6/1967  Miller et al. _____ 23—358

OTHER REFERENCES

Schechter et al., "Boron Hydrides and Related Compounds," prepared by Callery Chemical Co., printed March 1951, declassified 1954, pp. 52, 60.

OSCAR R. VERTIZ, Primary Examiner

HOKE S. MILLER, Assistant Examiner

U.S. Cl. X.R.

23—59